United States Patent
Allpress et al.

(10) Patent No.: US 7,230,982 B2
(45) Date of Patent: *Jun. 12, 2007

(54) DECISION FEEDBACK EQUALIZER FOR MINIMUM AND MAXIMUM PHASE CHANNELS

(75) Inventors: Steve A. Allpress, Hoboken, NJ (US); Quinn Li, Madison, NJ (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/344,406

(22) Filed: Jan. 31, 2006

(65) Prior Publication Data

US 2006/0120446 A1 Jun. 8, 2006

Related U.S. Application Data

(63) Continuation of application No. 09/941,027, filed on Aug. 27, 2001, now Pat. No. 7,006,563.

(60) Provisional application No. 60/279,907, filed on Mar. 29, 2001, provisional application No. 60/265,740, filed on Feb. 1, 2001, provisional application No. 60/265,736, filed on Feb. 1, 2001.

(51) Int. Cl.
*H03K 5/159* (2006.01)
*G06F 17/10* (2006.01)

(52) U.S. Cl. ............ 375/229; 375/240.15; 375/240.02; 708/300; 708/322; 708/323

(58) Field of Classification Search ............... None
See application file for complete search history.

(56) References Cited

U.S. PATENT DOCUMENTS 4,852,090 A * 7/1989 Borth .................. 370/347
5,050,186 A 9/1991 Gurcan et al.
5,155,742 A * 10/1992 Ariyavisitakul et al. .... 375/231

(Continued)

OTHER PUBLICATIONS

Liu Y-J et al, "A Soft-Output Bidirectional Decision Feedback Equalization Technique for TDMA Cellular Radio", Sep. 1993, IEEE Journal on Selected Areas in Communications, vol. 2 No. 7.

(Continued)

*Primary Examiner*—Kevin Kim
*Assistant Examiner*—Linda Wong
(74) *Attorney, Agent, or Firm*—McAndrews, Held & Malloy, Ltd.

(57) ABSTRACT

This invention describes an apparatus and method to improve the performance of a decision feedback equalizer (DFE) for time-varying multi-path channels. For minimum-phase channels, the equalization is performed in a time-forward manner. For maximum-phase channels, the equalization is performed in a time-reversed manner. More specifically, for maximum-phase channels, the filter coefficients are computed based on the channel estimates reversed in time, and the filtering and equalization operations are performed with the received block of symbols in a time-reversed order. In the context of this invention, the term "minimum-phase channel" implies that the energy of the leading part of the channel profile is greater than the energy of the trailing part. The term "maximum-phase channel" implies that the energy of the leading part of the channel profile is less than the energy of the trailing part.

13 Claims, 9 Drawing Sheets

U.S. PATENT DOCUMENTS

| | | | |
|---|---|---|---|
| 5,222,101 A * | 6/1993 | Ariyavisitakul et al. | 375/231 |
| 5,275,265 A * | 1/1994 | Castel | 188/356 |
| 5,335,250 A * | 8/1994 | Dent et al. | 375/224 |
| 5,513,215 A * | 4/1996 | Marchetto et al. | 375/233 |
| 5,930,296 A * | 7/1999 | Kot | 375/233 |
| 6,233,273 B1 | 5/2001 | Webster et al. | |
| 6,526,093 B1 | 2/2003 | Bao et al. | |
| 6,608,862 B1 | 8/2003 | Zangi et al. | |
| 6,690,723 B1 | 2/2004 | Gosse et al. | |
| 6,782,043 B1 | 8/2004 | Dehghan et al. | |
| 6,804,293 B1 * | 10/2004 | Brakemeier | 375/233 |

OTHER PUBLICATIONS

Wallace M et al, "Performance of Channel Codec with Channel State Information (CSI) fr the Equalized Cellular Radio Channels", IEEE, 1992.

Singer A C et al, "BAD: Bidirectional Arbitrated Decision Feedback Equalization", August 2001, www.ece.ucsb.edu/Faculty/Madhow/Publications/BAD_submission.pdf.

Ariyavisitakul S, "A Decision Feedback Equalizer with Time-Reversal Structure", Apr. 1992, IEEE Journal on Selected Area in Communications, vol. 10 No. 3.

Kamio Y et al, Performance of Reduced Complexity DFE Using Bidirectional Equalizing in Land Mobile Communications >>, 1992, IEEE.

Nagayasu Y et al, "Performance of 16QAM with Decision Feedback Equalizer Using Interpolation for Land Mobile Communications", 1992, IEEE.

Hafeez A et al, "Decision Feedback Sequence Estimation for Unwhitened ISI Channels with Applications with Multiuser Detection", Dec. 1998, IEEE Journal on Selected Areas in Communications.

* cited by examiner

DECISION FEEDBACK EQUALIZER FOR MINIMUM AND MAXIMUM PHASE CHANNELS

RELATED APPLICATIONS

This patent application is a continuation of U.S. patent application Ser. No. 09/941,027, filed Aug. 27, 2001, now U.S. Pat. No. 7,006,563, which claims priority of the following—U.S. Provisional patent application having Ser. No. 60/265,740 entitled "A Decision Feedback Equalizer for Minimum and Maximum Phase Channels," filed Feb. 1, 2001; U.S. Provisional patent application having Ser. No. 60/265,736 entitled "Method For Channel Equalization For TDMA Cellular Communication Systems," filed Feb. 1, 2001; and U.S. Provisional patent application having Ser. No. 60/279,907, entitled "A Novel Approach to the Equalization of EDGE Signals," filed Mar. 29, 2001; all of which are hereby incorporated by reference in their entirety.

FIELD OF THE INVENTION

The present invention provides an improved method for implementing a Decision Feedback Equalizer (DFE) based on the estimated channel response. For channels with a minimum-phase response, the equalization is performed in the conventional manner, whereas for channels with a maximum-phase response, the equalization is performed in a time-reversed manner.

BACKGROUND OF THE INVENTION

This invention addresses the receiver design for digital communication systems, specifically the equalization portion of the receiver. As an example, this invention has been applied to the EDGE standard ("Digital Cellular Communication System (Phase 2+) (GSM 05.01–GSM 05.05 version 8.4.0 Release 1999)"). The EDGE standard is built on the existing GSM standard, using the same time-division multiple access (TDMA) frame structure. EDGE uses 8-PSK (Phase-shift keying) modulation, which is a high-order modulation that provides for high data rate services. In 8-PSK modulation, three information bits are conveyed per symbol by modulating the carrier by one of eight possible phases.

A wireless channel is often temporally dispersive. In other words, after a signal is transmitted, a system will receive multiple copies of that signal with different channel gains, at various points in time. This time dispersion in the channel causes inter-symbol interference (ISI) which degrades the performance of the system.

FIG. 1 shows a prior art example of a multipath channel profile where the channel is characterized as being minimum-phase. The main signal cursor 102 is followed in time by post-cursors 104, 106, 108, and 110, each having progressively lesser energy than the main cursor. FIG. 2 shows a multipath channel profile characterized as being maximum-phase, where the main signal cursor 202 being followed by post-cursor energy rays 204, 206, 208, and 210, which are greater in energy than the main signal 202.

To combat the effects of ISI at the receiver, many different types of equalization techniques can be used. One popular equalization technique uses a Decision Feedback Equalizer (DFE). The DFE cancels the extraneous multipath components to eliminate the deleterious effects of ISI. A DFE is relatively simple to implement and performs well under certain known circumstances.

A DFE typically performs well over a minimum-phase channel, where the channel response has little energy in its pre-cursors and its post-cursor energy decays with time. A DFE typically consists of a feed-forward filter (FFF) and a feedback filter (FBF). The FFF is typically used to help transform the channel into such a minimum-phase channel. Accordingly, for channels with maximum-phase characteristics, it is often the case that the channel response after the FFF still contains a significant amount of the energy in its post-cursors, and the performance of the DFE can degrade over these channels. What is therefore needed in the art is an equalizer, of the DFE type (or like simplicity), which can enhance the performance of the DFE over both minimum and maximum phase channels.

SUMMARY OF THE INVENTION

The present invention is directed to an apparatus and method to improve the performance of a DFE for time-varying multi-path channels with maximum-phase characteristics. For minimum-phase channels, the equalization can be performed in a conventional, time-forward manner. For maximum-phase channels, the equalization can be performed in a time-reversed manner. More specifically, the FFF and the FBF coefficients can be computed based on the channel estimates reversed in time. Additionally, the FFF and the FBF operations can be performed with the received block of symbols in a time-reversed order, i.e., the most recently received symbol is processed first. By processing in this manner, the channel seen by the DFE will have a minimum phase, since its time-reversed channel response has maximum phase. This scheme is intended for any wireless and wireline communication systems where the benefits of such forward and reverse processing will be realized.

One aspect of the present invention provides for an improved decision feedback equalizer apparatus for use with minimum and maximum phase channel responses, the apparatus comprising: a channel estimator for providing an estimated channel response from received signal data; a device for determining if the channel is minimum phase or maximum phase; a feed-forward filter and a feedback filter of an associated decision feedback equalizer having coefficients computed: (a) from the channel response considered in a time-forward manner, if the channel is minimum phase, or (b) from the channel response considered in a time-reversed manner, if the channel is maximum phase; a data processor for processing the signal data: (a) in a time-forward manner, if the channel is minimum phase, or (b) in a time-reversed manner if the channel is maximum phase.

Still another aspect of the present invention provides for a method for implementing an improved decision feedback equalizer for use with minimum- and maximum-phase channel responses, the method comprising the steps of: estimating the channel response for a received signal; determining if the phase characteristic of the channel is minimum phase or maximum phase; calculating the coefficients for a feed-forward filter and feedback filter of an associated decision feedback equalizer as follows: if the channel is minimum phase, then calculate the coefficients by considering the estimated channel response in a time-forward manner; if the channel is maximum phase, then calculate the coefficients by considering the estimated channel response in a time-reversed manner.

Still another aspect of the present invention provides for a method for implementing an improved decision feedback equalizer for use with minimum- and maximum-phase channel responses, the method comprising the steps of: estimating the channel response for a received signal; determining the phase characteristic of the channel by: analyzing the estimated channel response; determining the relative strength of the energies in the leading part and the trailing part of the estimated channel response; characterizing the channel as minimum phase if the collective strength of the energies in the leading part is greater than the collective strength of the energies in the trailing part; characterizing the channel as maximum phase if the collective strength of the energies in the trailing part is greater than the collective strength of the energies in the leading part; calculating the coefficients for a feed-forward filter and feedback filter of an associated decision feedback equalizer using the estimated channel response, and processing the data from the received signal: (a) in a time-forward manner, if the channel is minimum phase, or (b) in a time-reversed manner if the channel is maximum phase.

BRIEF DESCRIPTION OF THE DRAWINGS

Certain aspects and advantages of the present invention will be apparent upon reference to the accompanying description when taken in conjunction with the following drawings, which are exemplary, wherein.

DESCRIPTION OF THE PREFERRED EMBODIMENTS

The present invention is described below in terms of certain preferred embodiments and representative applications. The apparatus and processing methods are intended to be used with any communication system having a multipath channel (wireless, wired, or otherwise) that exhibits both minimum- and maximum-phase characteristics. The channel is said to be minimum-phase when the zeros of its z-transform lie anywhere inside the unit circle in the z-plane, whereas the channel is said to be maximum-phase when the zeros of its z-transform lie anywhere outside the unit circle in the z-plane. The processing is described in terms of a DFE but is equally applicable to other equalization and processing techniques. In particular, the present invention is fully applicable to any wireless or wireline communication system where a DFE is used.

A representative application of the invention is the EDGE system, and a preferred embodiment is described below. Since radio spectrum is a limited resource shared by all users, a method must be devised to divide up the bandwidth among as many users as possible. The GSM/EDGE system uses a combination of Time- and Frequency-Division Multiple Access (TDMA/FDMA). The FDMA part involves the division by the frequency of the (maximum) 25 MHz bandwidth into 124 carrier frequencies spaced 200 kHz apart. One or more carrier frequencies are assigned to each base station. Each of these carrier frequencies is then divided in time, using a TDMA scheme. The fundamental unit of time in this TDMA scheme is called a burst period, and it lasts for $15/26$ ms (or approximately 0.577 ms). Eight burst periods are grouped into a TDMA frame ($120/26$ ms, or approximately 4.615 ms) which forms the basic unit for the definition of logical channels. One physical channel is one burst period per TDMA frame.

Figure 1:
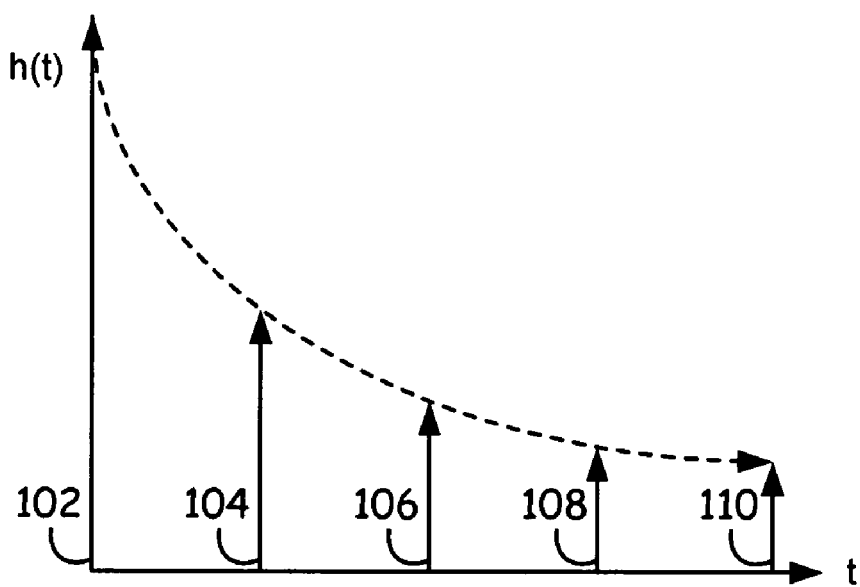
FIG. 1 is a prior art representation of typical minimum-phase channel profile.
Figure 2:
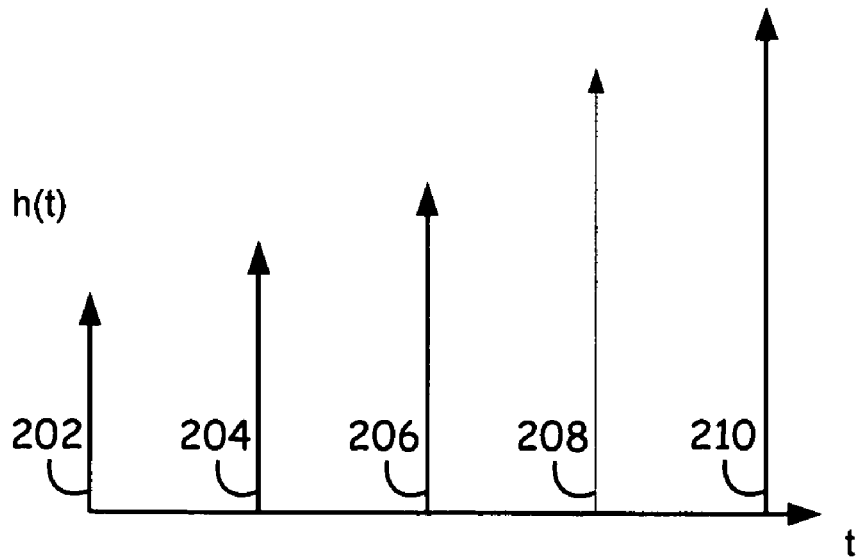
FIG. 2 is a prior art representation of typical maximum-phase channel profile.
Figure 3:
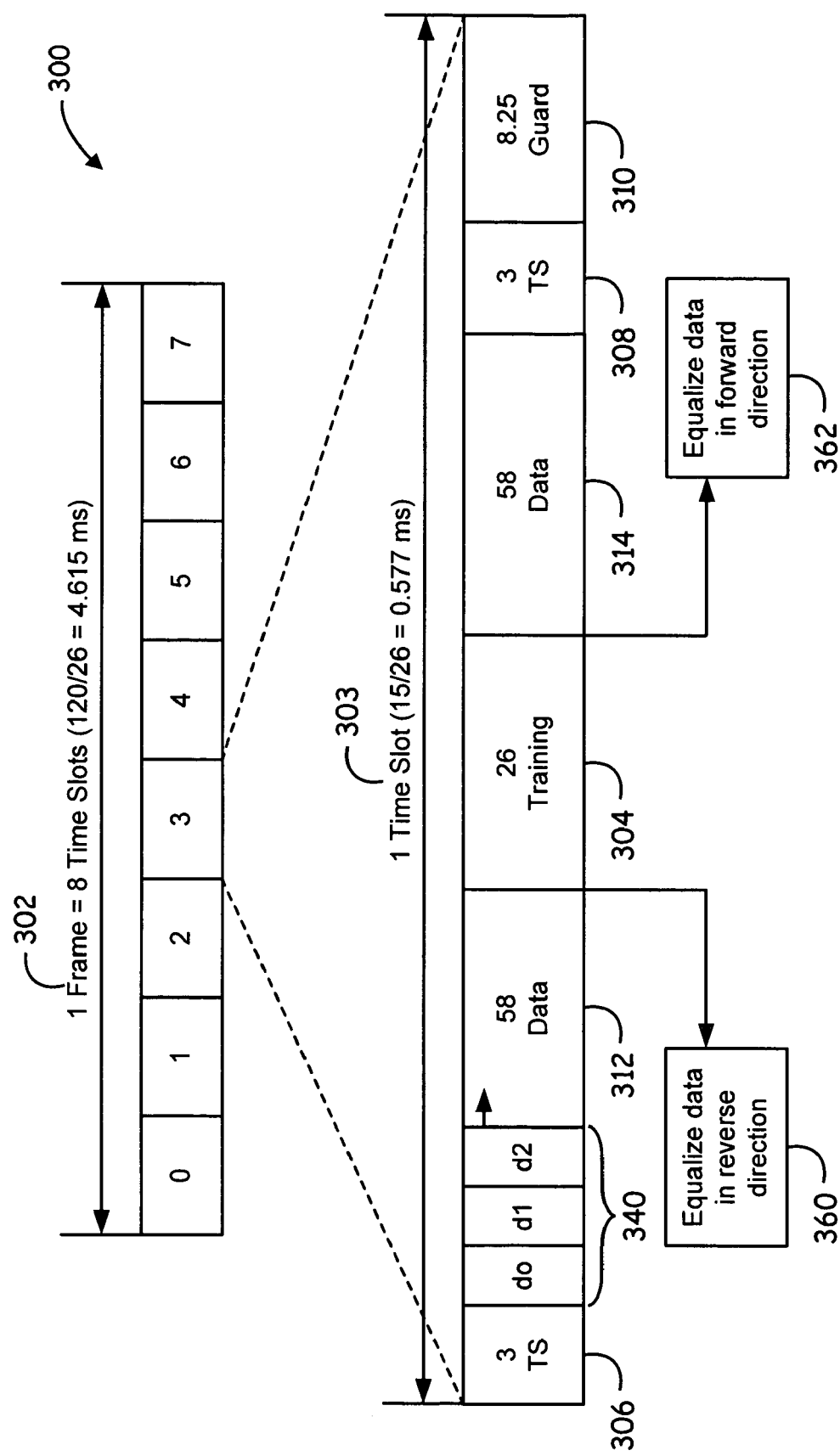
FIG. 3 is a representative diagram of an EDGE burst structure, according to one aspect of the present invention, with equalization performed in the forward or the reverse direction.

Many EDGE physical layer parameters are identical (or similar) to those of GSM. The carrier spacing is 200 kHz, and GSM's TDMA frame structure is unchanged. FIG. 3 shows a representative diagram 300 of an EDGE burst structure. One frame 302 is shown to include eight time slots. Each representative time slot 303 is shown to include a training sequence 304 of 26 symbols in the middle, three tail symbols 306, 308 at either end, and 8.25 guard symbols 310 at one end. Each burst carries two sequences of 58 data symbols. The data sequences 312 and 314 are shown on either side of the training sequence 304.

Figure 4:
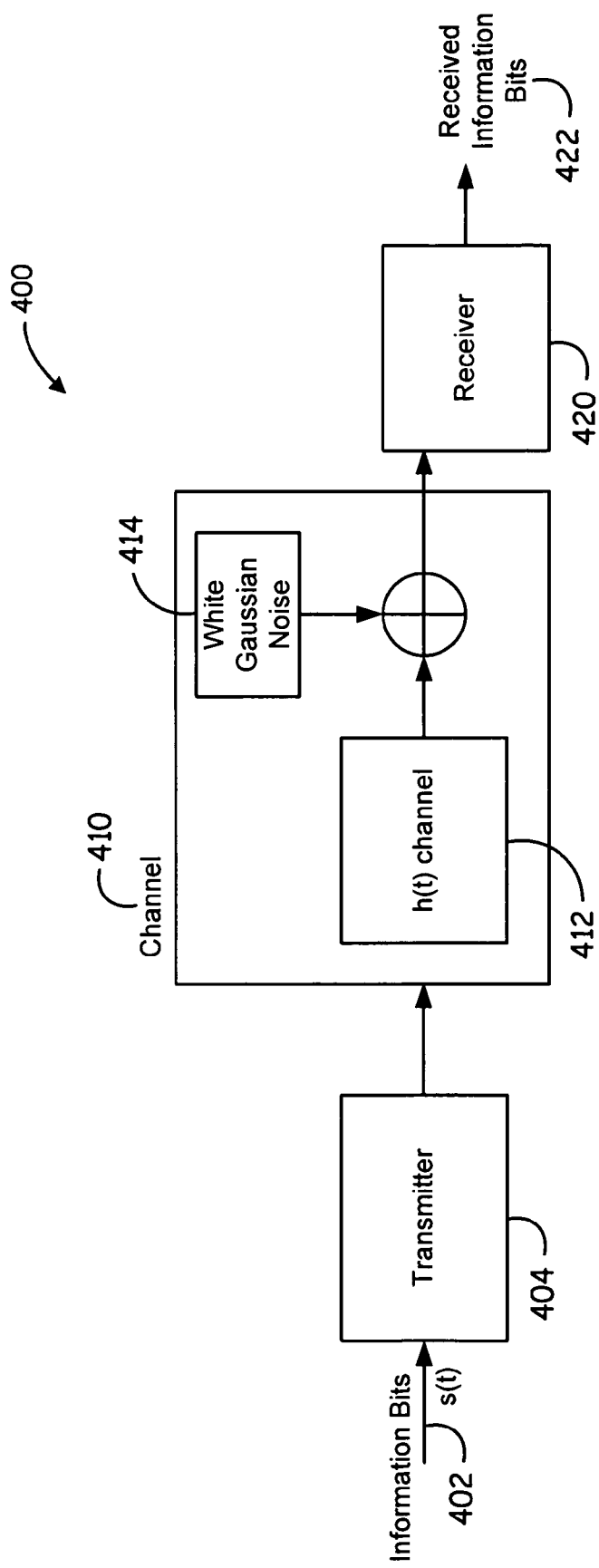
FIG. 4 is a block diagram of representative transmitter, channel, and receiver, according to one aspect of the present invention.

FIG. 4 next shows a prior art block diagram 400 of a communication system that consists of a transmitter 404, a channel 410, and a receiver 420. The signal s(t) 402 represents a sequence of information that is going to be transmitted over a channel. The transmitted signal encounters a channel 410 (which includes multiplicative, dispersive component 412 and additive white Gaussian noise component 414). The receiver 420 attempts to recover the original signal s(t) as received information bits 422.

Figure 5:
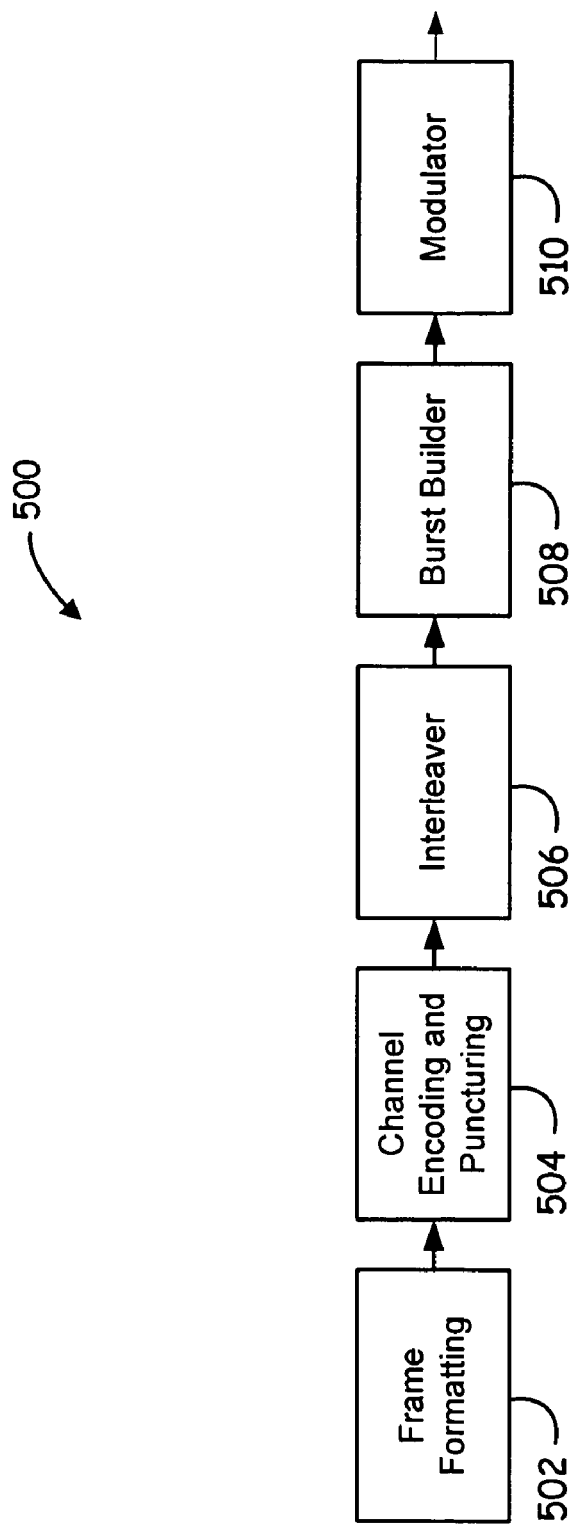
FIG. 5 is a block diagram of representative transmitter elements, according to one aspect of the present invention.

A more specific block diagram of the transmitter portion 500 is shown in FIG. 5. In particular this diagram is described in terms of GSM and EDGE applications. The user data is first formatted into a frame via block 502. Thereafter the data is convolutionally encoded and punctured as shown in block 504. The signal is passed to an interleaver 506 that scrambles the coded bits and distributes them across four bursts, shown as the burst builder block 508. The GMSK or 8PSK modulator is shown in block 510.

The transmitted signal thereafter passes through a multi-path fading channel h(t) and is corrupted by additive white Gaussian Noise n(t). Assuming that the span of the overall channel response is finite, the discrete-time equivalent model of the received signal can be written as $$r_n = \sum_{k=0}^{L} d_{n-k} h_k + \eta_n, \tag{1}$$

where L is the span of the composite channel response (consisting of the cascade pulse-shaping filter, propagation channel and the receiver front-end filter), dn is the nth transmitted data symbol, $\{h_o, h_1, \ldots, h_L\}$ are the complex coefficients of the channel response, and $\eta_n$ is the complex, zero-mean, white Gaussian random variable.

Figure 6:
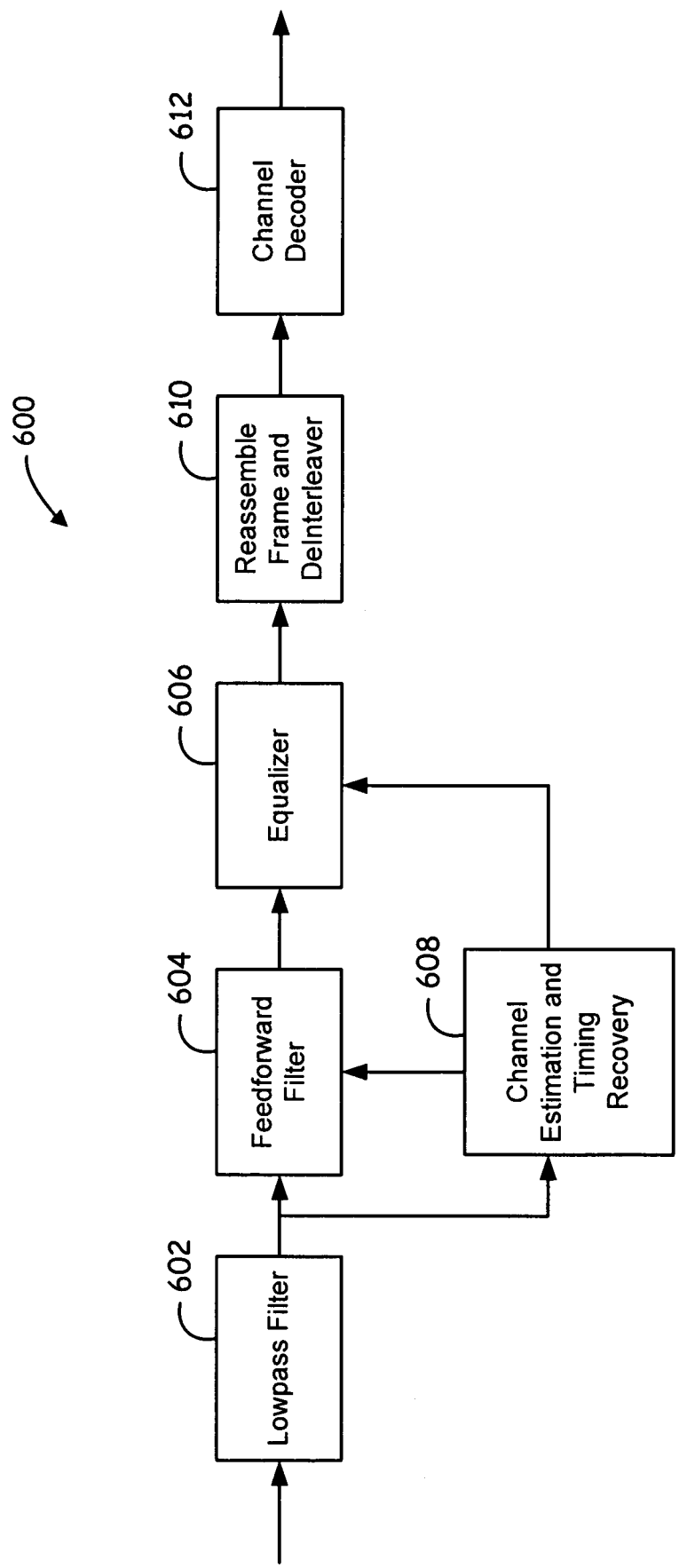
FIG. 6 is a block diagram of representative receiver elements, according to one aspect of the present invention.

A block diagram of a typical EDGE receiver 600 is shown in FIG. 6. The received signal, after analog-to-digital conversion, is passed through a digital, low-pass filter 602 to enhance the signal-to-noise ratio within the signal bandwidth of interest. A Feed-forward filter (FFF) 604 is used to try to convert the channel to a minimum-phase channel. The FFF coefficients are computed in block 608 based on the channel estimates, which along with the sample timing, are derived from the correlation of the received signal with a known training sequence. The output from the FFF is passed to an equalizer 606 which attempts to eliminate the ISI having the composite response given by the transmitter pulse, the channel impulse response, and the receiver filter. The equalizer might be a DFE or, alternatively, a combination of a DFE with a MAP or MLSE. In block 610, the output from the equalizer is then reassembled into a frame, and a deinterleaver is applied (if needed). This signal is then passed to the channel decoder 612, if channel coding was applied at the transmitter.

Figure 7:
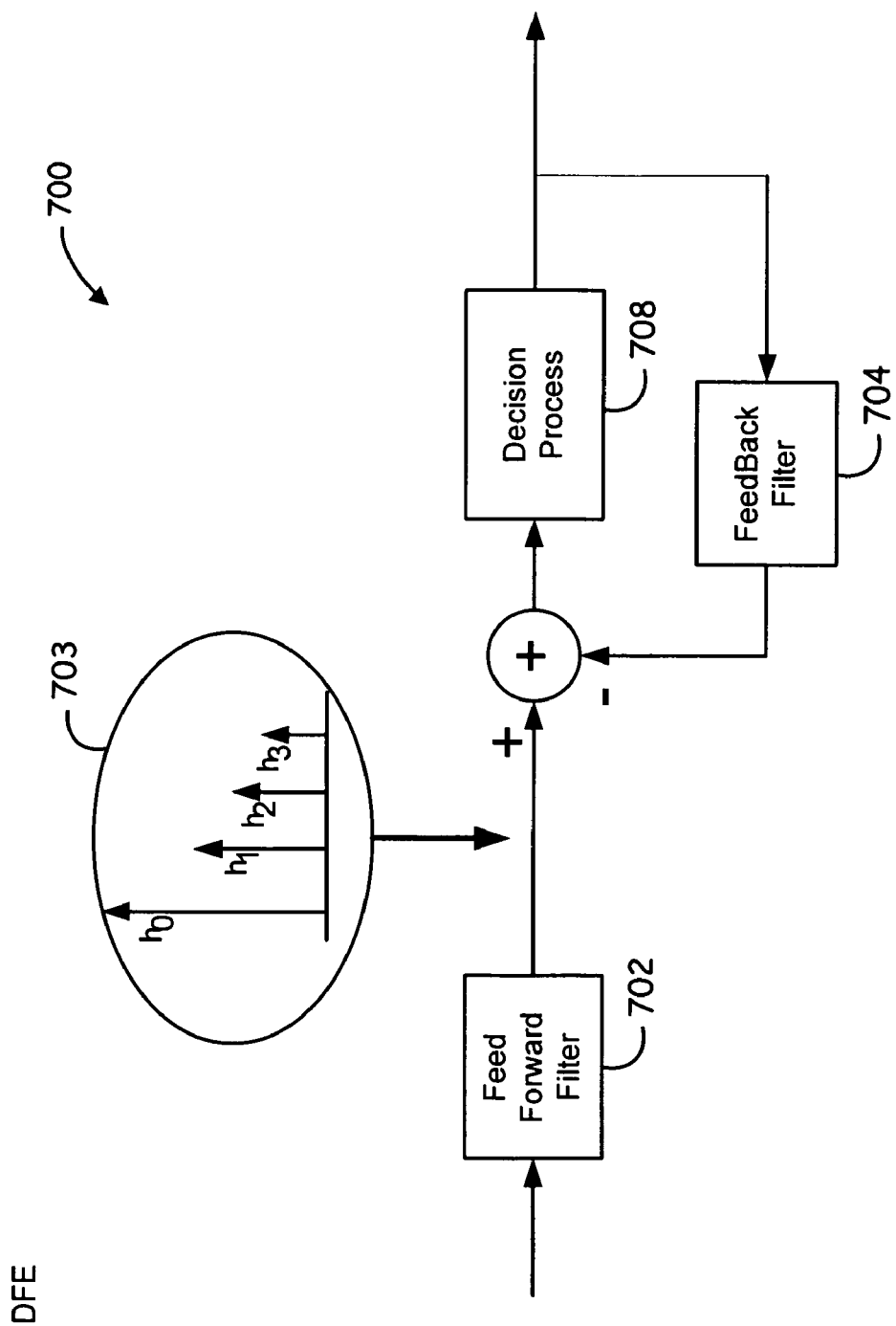
FIG. 7 is a prior art block diagram of representative DFE elements, with an associated channel response after the feed-forward filter.

FIG. 7 next shows a representative prior art block diagram 700 of a DFE device which might be used as the equalizer device above. A standard DFE consists of two filters, a feed-forward filter (FFF) 702 and a feedback filter (FBF) 704. The FFF is generally designed to act as a whitened matched filter to the received incoming signal, thus maximizing the signal to noise ratio, while keeping the statistical properties of the noise Gaussian with zero mean. A representative channel response (with interference) which might exist after the FFF is shown as 703 and has signal rays $h_0$, $h_1$, $h_2$, and $h_3$. The FBF 704 is used to reconstruct post-cursor interference using decisions made on previously detected symbols. After filtering 704, the post-cursor interference is subtracted from the output of FFF 702, and a decision 708 is made on this output.

Accordingly, the input to the decision device, in discrete form, is as follows:

$$z_n = \sum_{k=-N_f}^{0} f_k r_{n-k} - \sum_{k=1}^{N_b} \hat{d}_{n-k} b_k, \tag{2}$$

where $f_k$, $k=-N_f, \ldots, 0$ are the coefficients of the feed-forward filter, $b_k$, $k=1, \ldots, N_b$ are the coefficients of the feedback filter, and $\hat{d}_n$ denotes the decision made on the symbol $d_n$. The number of the feedback coefficients $N_b$ may be different from the length of the overall channel response L. Hereafter, we will assume $N_b=L$. The coefficients of the FFF and the FBF for the DFE can be computed using a variety of computationally efficient methods. One such method entitled "Fast Computation of Channel-Estimate-Based Equalizers in Packet Data Transmission" has already been incorporated by reference above.

Soft-decision decoding might also be applied to the outputs of the DFE. As shown in FIG. 6, the symbol decisions from the equalizer are de-interleaved and passed to the channel decoder. Since soft-decision decoding improves the performance, the hard symbol decisions output from the DFE are weighted with the appropriate channel gain before they are passed to the decoder. Typically a hard decision is made on the symbol $d_n$ which is then weighted by a soft-value $s_o$, as given by the following equation, to produce an appropriate weighting for soft-decision decoding.

$$s_o = \sum_{k=0}^{L} h_k h_k^* \tag{3}$$

Hence, the soft value is a function of the channel coefficients. Other examples include making the soft value proportional to the energy gain of the channel.

Figure 8:
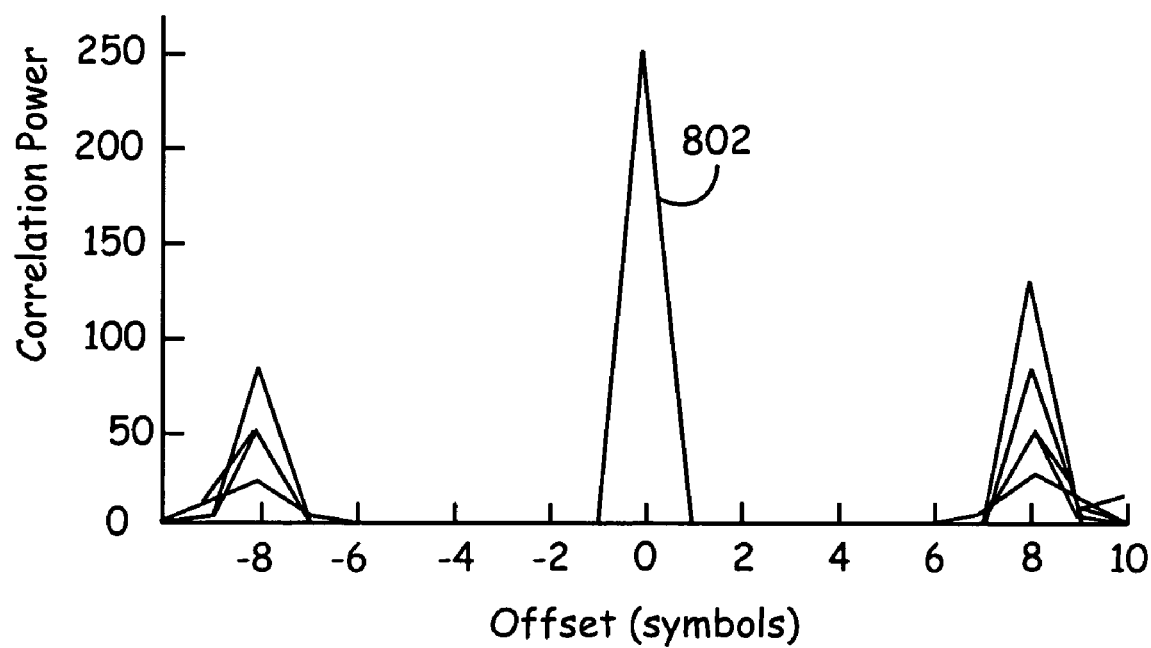
FIG. 8 is a prior art diagram of the auto-correlation of Training Sequences.

Referring again to FIG. 3, the timing recovery and channel estimation are performed with the aid of the training sequence 304. Each of these training sequences has the property that the result of correlating the middle 16 symbols with the entire training sequence yields a correlation function with identically zero values for +/−5 symbols around the peak 802, as shown in FIG. 8. For timing recovery, the oversampled received signal is correlated with the stored training sequence. The optimal symbol timing is given by the index of the subsample with the largest correlation value. Once the optimal symbol timing is determined, the estimates of the channel response, i.e., $\{h_o, h_1, \ldots, h_L\}$, are given by a window of L+1 symbol-spaced correlation values with the largest sum of energy. Since the auto-correlation values given by the training sequence are approximately zero for up to +/−7 symbols around the peak 1002, the maximum window size L may be as large as 7. Since the duration of the burst is 0.577 ms, the channel can be assumed to be stationary during the burst for most vehicle speeds of practical interest.

Based on the channel estimates given from the channel estimator block 608 in FIG. 6, a determination of whether the channel has maximum-phase response is made. In the context of this invention, the term "minimum-phase channel" implies that the energy of the leading part of the channel profile is greater than the energy of the trailing part. The term "maximum-phase channel" implies that the energy of the leading part of the channel profile is less than the energy of the trailing part. More precisely, the position of the centroid of the energy, with respect to the mean arrival time, specifies (approximately) the type of channel response.

Figure 9:
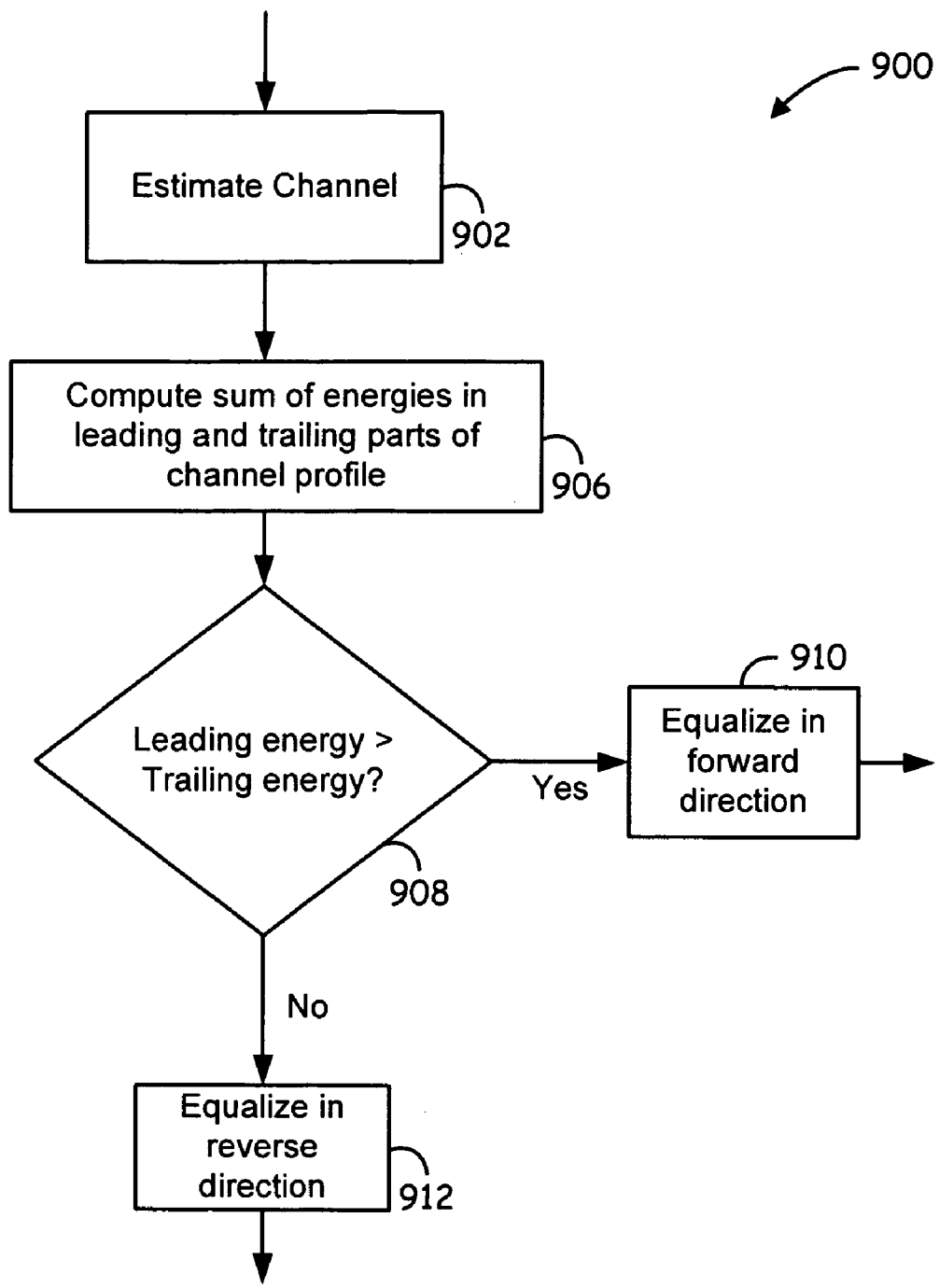
FIG. 9 is a flowchart of certain representative steps, according to one aspect of the present invention, which can be used to implement the equalization.

While the present invention is meant to be generally applicable to any application using a DFE, the GSM (and EDGE) environments work particularly well due to the presence of the training sequence in the middle of each data burst. Accordingly, FIG. 9 shows a representative sequence of steps 900 which might be used to implement the present invention. In step 902, an estimate of the channel is performed. According to the examples above, the training sequence is used to derive the channel estimates. Referring again to FIG. 3, each section of received data symbols 312 and 314 is stored in the memory of the receiver (i.e., d0, d1, d2, etc., shown as 340) that can be retrieved and processed in any needed order. Step 906 next shows the determination of the estimated channel response being minimum-phase or maximum-phase. For instance, the multipath energy given by the leading and trailing parts of the channel response is determined. Decision block 908 next inquires whether the energy given by the leading part is greater than that given by the trailing part. If the energy given by the leading part is greater, then the channel is classified as having a minimum-phase response with a time-decaying shape (from left to right). If the energy from the trailing part is greater, then the channel is classified as having a maximum-phase response.

For a channel with maximum-phase response, the equalization is performed in a time-reversed manner, as shown in step 912. For minimum-phase channels, the equalization is performed in a time-forward manner, as shown in step 910. In FIG. 3, the comparable equalization steps are shown as 360 for reverse equalization of the received symbols 312, and 362 for forward equalization of the received symbols 314.

Figure 10:
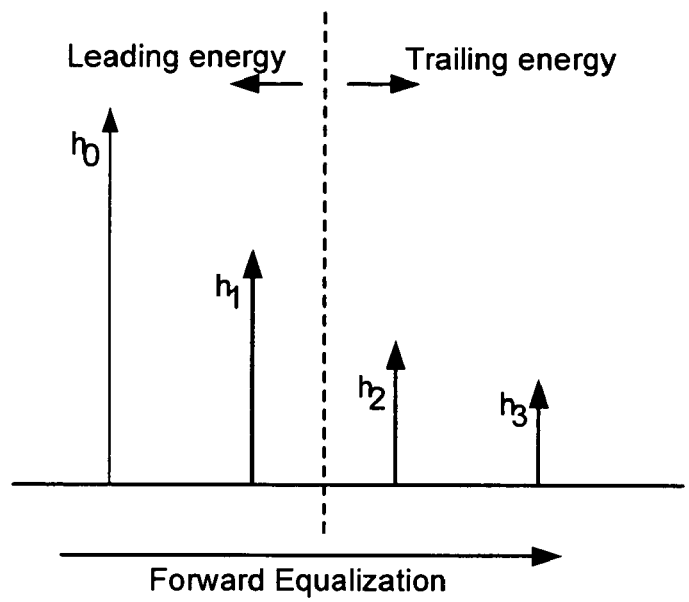
FIG. 10 is a plot of a representative channel response with signal elements being analyzed to derive the need for equalization in a time-forward manner.
Figure 11:
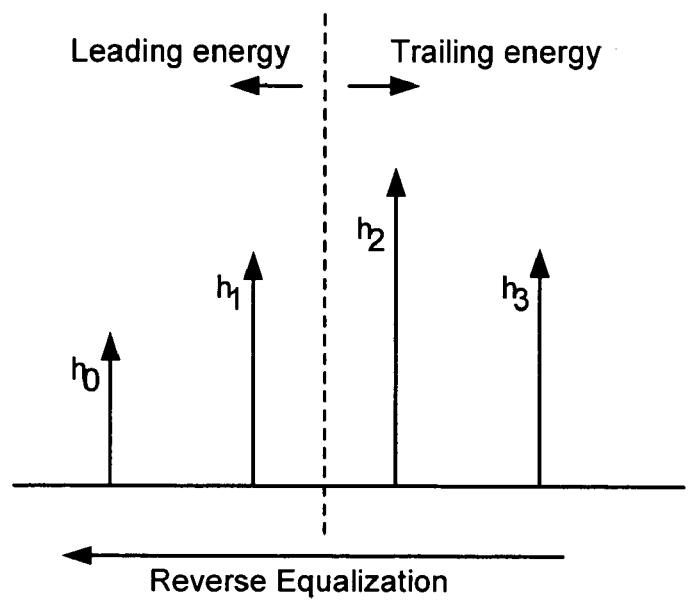
FIG. 11 is a plot of a representative channel response with signal elements being analyzed to derive the need for equalization in a time-reversed manner.

FIGS. 10 and 11 serve to further demonstrate the decision process used to determine whether forward or reverse equalization will be applied. FIG. 10 shows a representative channel with four complex signal components, $h_0$, $h_1$, $h_2$ and $h_3$. The following formula is used as the decision rule:

$$|h_o|^2+|h_1|^2>|h_2|^2+|h_3|^2 \quad (4)$$

In FIG. 10, according to the relative amplitudes shown, the energy from the leading part of the channel response will be greater than the trailing part, and the above formula will be "true." The channel will therefore have minimum-phase characteristics, and forward equalization will be performed. In FIG. 11, according to the relative amplitudes shown, the energy from the trailing part will be greater than the energy from the leading part, and the formula above will return "false." The channel will therefore have maximum-phase characteristics, and reverse equalization will be performed.

Accordingly, by using the described approach, the channel response can be classified on a burst/slot by burst/slot basis. For a burst where the channel response is classified as maximum-phase, the estimated channel response can be reversed in time, and the coefficients of the FFF and the FBF can be computed based upon this time-reversed channel response. Furthermore, the FFF and FBF operations can be performed in a time-reversed order, i.e., the most recently received symbol can be fed into the filter first. As a result, the channel seen by the DFE is guaranteed to be minimum phase, since its time-reversed version has maximum phase. For a burst where the channel response is classified as minimum phase, the FFF and FBF operation can be performed in the normal order, i.e., the earliest-received symbol is processed first. Note that, while the concept of "leading" and "trailing" are used to refer to parts of the multipath channel profile, the present invention is not meant to be strictly limited to this physical description. The channel may be analyzed in a variety of ways to determine whether it is more appropriate to attempt equalization in a forward direction or in a time-reversed manner. The formula above, where the absolute values of the complex components are determined and squared, is intended to serve as a representative embodiment, with the present invention not intended to be limited to such computational methods.

Although the present invention has been particularly shown and described above with reference to specific embodiment(s), it is anticipated that alterations and modifications thereof will no doubt become apparent to those skilled in the art. It is therefore intended that the following claims be interpreted as covering all such alterations and modifications as fall within the true spirit and scope of the invention.

The invention claimed is:

1. An equalizer apparatus for equalizing a data signal received from a channel, the apparatus comprising:

a channel estimator operable to determine whether a channel response of the channel is minimum-phase or maximum-phase; and a decision feedback equalizer operable to perform equalization of the signal in a time-forward manner when the channel response is minimum-phase and in a time-reversed manner when the channel response is maximum-phase.

2. The equalizer apparatus of claim 1, wherein the channel estimator determines the relative strength of the energies in the channel response and compares the energies to determine if the channel is minimum-phase or maximum-phase.

3. The equalizer apparatus of claim 2, wherein the relative strength of the energies in the leading part of the channel response is compared to the relative strength of the energies in the trailing part of the channel response.

4. The improved equalizer apparatus of claim 3, wherein the energies of multipath components in the leading part and the trailing part of the channel response are summed and used to derive whether the channel is minimum or maximum phase.

5. The equalizer apparatus of claim 1, wherein the apparatus is used in a Global System for Mobile Communication (GSM) system.

6. The equalizer apparatus of claim 1, wherein the apparatus is used in an Enhanced Data for Global Evolution (EDGE) system.

7. The equalizer apparatus of claim 1, wherein the channel response is classified on a burst/time slot basis.

8. A method for equalizing data signals received from a channel, the method comprising:

determining whether a channel response of the channel is minimum-phase or maximum-phase; and performing decision feedback equalization of the signal in a time-forward manner when the channel response is minimum-phase and in a time-reversed manner when the channel response is maximum-phase.

9. The method of claim 8, wherein determining whether the channel response is minimum-phase or maximum-phase comprises:

determining the relative strength of the energies within the estimated channel response;

characterizing the channel as minimum-phase when the collective strength of the energies in leading part of the estimated channel response is greater than the collective strength of the energies in the trailing part of the estimated channel response; and characterizing the channel as maximum-phase when the collective strength of the energies in the trailing part of the estimated channel response is greater than the collective strength of the energies in the leading part of the estimated channel response.

10. The method of claim 8, wherein determining whether the channel response is minimum-phase or maximum-phase includes utilizing a sequence of training symbols in the received signal to facilitate estimation of the channel response.

11. The method of claim 8, wherein the method is applied to a receiver in a GSM system.

12. The method of claim 8, wherein the method is applied to a receiver in an EDGE system.

13. The method of claim 8, wherein the estimated channel response is classified on a burst/time slot basis.

* * * * *